United States Patent
Lou et al.

(10) Patent No.: US 11,271,656 B1
(45) Date of Patent: Mar. 8, 2022

(54) DISPERSING DATA RATE TO MITIGATE ELECTROMAGNETIC INTERFERENCE

(71) Applicant: Cisco Technology, Inc., San Jose, CA (US)

(72) Inventors: Jianquan Lou, Shanghai (CN); Alpesh Umakant Bhobe, Sunnyvale, CA (US); Hailong Zhang, Shanghai (CN); Xiao Li, Milpitas, CA (US); Guangcao Fu, Shanghai (CN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/086,819

(22) Filed: Nov. 2, 2020

(51) Int. Cl.
*H04B 10/50* (2013.01)
*H04L 7/00* (2006.01)

(52) U.S. Cl.
CPC ........... *H04B 10/50* (2013.01); *H04L 7/0075* (2013.01)

(58) Field of Classification Search
CPC .............. H04B 10/50; H04B 10/25759; H04L 7/0075; H04L 27/0008
See application file for complete search history.

(56) References Cited

U.S. PATENT DOCUMENTS

| | | | |
|---|---|---|---|
| 8,073,040 B1 | 12/2011 | Chan et al. | |
| 2003/0055998 A1* | 3/2003 | Saha | H04J 3/1617 709/233 |
| 2004/0086278 A1* | 5/2004 | Proano | H04J 3/04 398/154 |
| 2004/0202205 A1* | 10/2004 | Sheth | H04J 3/07 370/539 |
| 2010/0313089 A1 | 12/2010 | Rajski et al. | |
| 2010/0315135 A1 | 12/2010 | Lai et al. | |
| 2015/0036699 A1 | 2/2015 | Yu | |
| 2015/0098537 A1 | 4/2015 | Sengoku | |
| 2016/0050010 A1* | 2/2016 | Buehler | H04B 1/0042 455/73 |
| 2018/0309603 A1* | 10/2018 | Chen | H04L 27/0008 |

OTHER PUBLICATIONS

Maxim Integrated Products, Inc., "11.3Gbps, Low-Power, DC-Coupled Laser Driver", MAX3948, 19-5943; Rev 1, Jun. 2012, 37 pages.
Phyworks, "OB10GbE Linear Transimpedance Amplifier", PHY1090, 19-5686; Rev 1/11, downloaded Nov. 2, 2020, 10 pages.
Maxim Integrated Products, Inc., "1.0625Gbps to 11.3Gbps, SFP+ Dual-Path Limiting Amplifier", 19-5144; Rev 0, Feb. 2010, 24 pages.

* cited by examiner

*Primary Examiner* — Dzung D Tran
(74) *Attorney, Agent, or Firm* — Edell, Shapiro & Finnan, LLC

(57) ABSTRACT

A method in which a plurality of transmit signals are generated at data rates that are offset from each other to minimize detectable electromagnetic interference at a particular frequency. The method further includes converting each transmit signal to a corresponding optical transmit signal of a plurality of optical transmit signals for transmission via a corresponding channel of a plurality of channels of an optical network device and transmitting the plurality of optical transmit signals via respective ones of the plurality of channels for transmission on respective optical fibers.

20 Claims, 9 Drawing Sheets

DISPERSING DATA RATE TO MITIGATE ELECTROMAGNETIC INTERFERENCE

TECHNICAL FIELD

The present disclosure relates to optical network communications.

BACKGROUND

With increasing demands of transmitting data at higher data rates, new hardware and software techniques are being developed. Network devices such as optical switches include higher port density to accommodate these increasing demands. For example, one rack unit box may have more than forty-eight ports and one modular chassis may have over hundred ports. Additionally, data is transmitted at higher data rates. Ports may run at a speed of 40 gigabits per second (40G), 100G, 400G, or even higher. High port density in combination with high data rates creates challenges in circuit design. One challenge is managing radiation emitted by these devices, which can cause electromagnetic interference to exceed acceptable levels.

DESCRIPTION OF EXAMPLE EMBODIMENTS

Overview

Figure 1A:
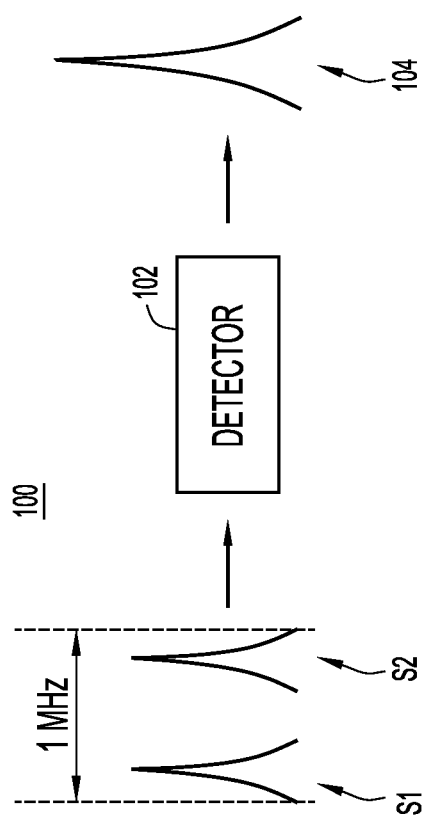
FIGS. 1A and 1B are diagrams illustrating electromagnetic interference emitted from a device at a given frequency.

Briefly, systems and methods are provided to produce transmit signals at different data rates at ports of a network device to mitigate detectable amount of electromagnetic interference around the network device at any particular frequency. This is of particular importance when the network device has a high port density such that different ports/channels of signals transmitted by the network device are physically close to each other such that the resulting electromagnetic interference at a given frequency caused by such close proximity could exceed acceptable levels.

In the systems and methods presented herein, a network device generates a plurality of transmit signals at data rates that are offset from each other to minimize detectable electromagnetic interference at a particular frequency. The network device also converts each transmit signal to a corresponding optical transmit signal of a plurality of optical transmit signals for transmission via a corresponding channel of a plurality of channels of an optical network device and transmits the plurality of optical transmit signals via respective ones of the plurality of channels for transmission onto respective optical fibers.

Additionally, in these systems and methods, an apparatus includes a plurality of processing channels, each of which produces a transmit signal at a corresponding different data rate. Each of the plurality of processing channels includes a serializer configured to obtain a corresponding input data stream and produce an output data stream at a corresponding data rate, and a driver configured to receive the output data stream from the serializer for driving a corresponding optical transmitter to produce a corresponding optical transmit signal for transmission via a corresponding port of an optical network device onto an optical fiber. The serializer in a first processing channel of the plurality of processing channels is configured to produce a first output data stream at a main data rate and serializers of other processing channels are configured to produce output data streams at data rates that are offset by increasing incremental amounts from the main data rate so as to minimize a detectable aggregate amount of electromagnetic interference around the apparatus at any particular frequency.

Example Embodiments

In current communication systems, network devices transmit data at high rates and have a high port density. This, in turn, may result in electromagnetic interference (EMI) exceeding acceptable levels at a given frequency. For example, a 10G/40G switch operating at 10.3 GHz or a 25G/100G/400G switch operating at 25.78 GHz causes radiation compliance issues because of the high data rates of closely physically positioned ports on the network device. This is of particular concern for optical network devices (e.g., switches) and makes it a challenge to pass electromagnetic compatibility (EMC)/EMI tests.

Various techniques are adopted in an attempt to mitigate these radiation issues. One technique involves improving EMI performance of the optical components of a network device by, for example, adding absorbers inside these optical components to reduce radiation. Other techniques include re-designing the hardware by changing a printed circuit board (PCB) placement/routing, firmware tuning for the physical layer (PHY)/clock and data recovery (PHY/CDR), adding absorbers, and so on. Yet another technique involves enhancing shielding effectiveness by adding more gaskets and/or using less and/or smaller vent holes to reduce the amount of noise coming out of the respective switch. These various techniques have limited effectiveness. As the speed of data transmission and the density of the ports increases, these techniques may become inadequate to solve the EMI issue.

Example embodiments presented herein provide for system with dispersed data rates at the transmit ports of the network device to mitigate the EMI issue. The system includes a coding mechanism designed to disperse the data rates across a plurality of channels from which transmit signals are sent via a plurality of ports, as well as a phase locked loop (PLL) configuration designed to account for the dispersed data rates. As a result of these techniques, network devices are compatible with current systems and yet are configured to pass the EMC/EMI testing while having high-density ports and/or high data rates.

In the United States, the Federal Communications Commission (FCC), part 15, governs electromagnetic interference produced by a network device, for any frequency above 1000 MHz, the radiated emission limits are based on the use of measurement instrumentation employing an averaging detector function performed using a minimum resolution bandwidth of 1 MHz.

Figure 1B:
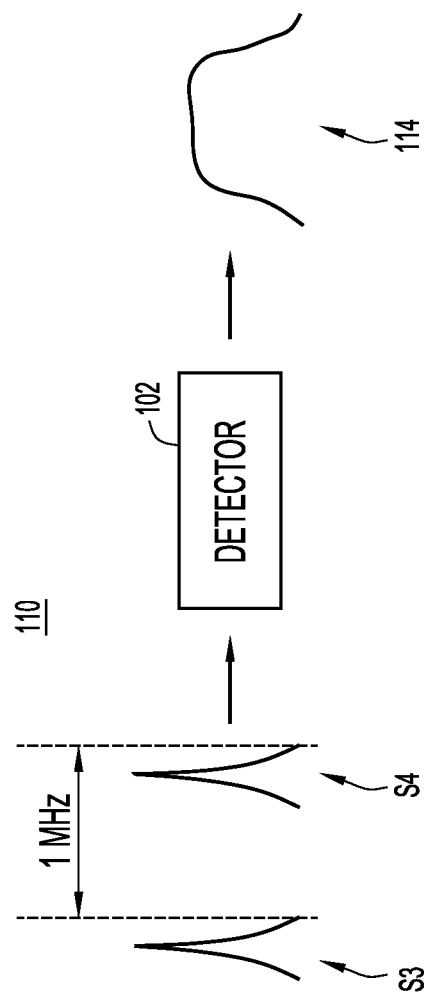

FIGS. 1A and 1B are diagrams 100 and 110, respectively, illustrating EMI measurement operations in accordance with FCC, part 15.

In the diagram 100, a measurement detector 102 or an EMI detector detects radiation produced by two signals S1 and S2. The signals S1 and S2 are transmitted at the same frequency or at two frequencies ($f_1$ and $f_2$) that are spaced apart by less than 1 MHz i.e., $|f_1-f_2|<1$ MHz. As a result, the measurement detector 102 detects the radiated energies produced by these two signals S1 and S2 together. The measurement detector outputs a total radiation 104 that is the added energy produced by these two signals S1 and S2.

In the diagram 110, the measurement detector 102 detects radiation produced by two signals S3 and S4, as separate energy points. That is, signals S3 and S4 are transmitted at frequencies ($f_3$, $f_4$) that are spaced apart from one another by more than 1 MHz i.e., $|f_3-f_4|\geq1$ MHz. As a result, the measurement detector 102 detects radiated energy produced by these two signals S3 and S4 and outputs a lower total radiation 114 i.e., because the measurement detector 102 detects the radiation from signals S3 and S4 as two separate energy radiation points.

Figure 2:
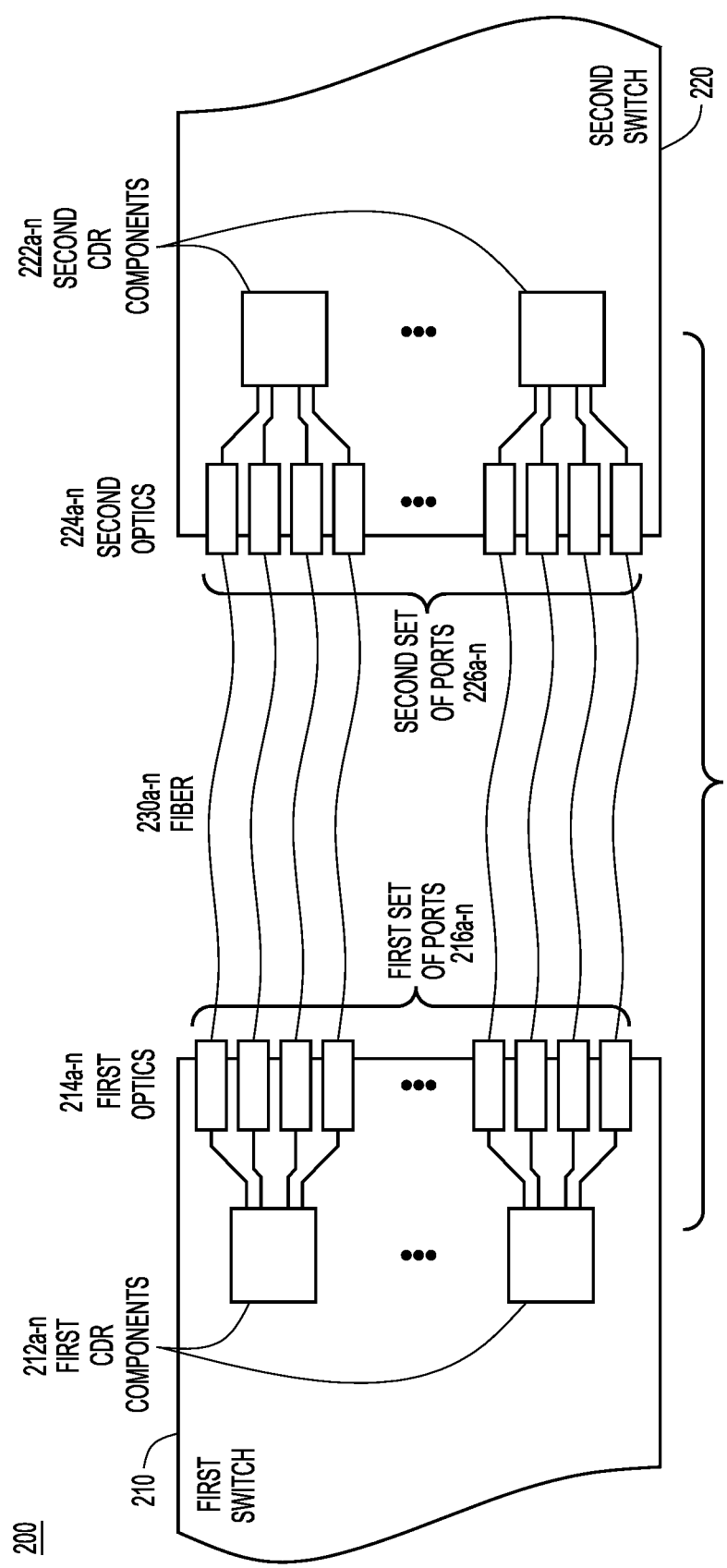
FIG. 2 is a block diagram illustrating a system that uses the same data rate for transmitting signals via a plurality of channels.

FIG. 2 depicts a system 200 in which ports/channels are configured to operate at the same data rate. The system 200 includes a first switch 210, a second switch 220, and optical links or optical fibers 230a-n connecting respective ports of first switch 210 with corresponding ports of second switch 220. The reference numeral suffix "a-n" is intended to denote that the number of ports/channels may vary based on a particular deployment of the system 200.

The first switch 210 and the second switch 220 are network elements or devices (nodes), such as an enterprise core switch, a data center switch, or other high speed switch, that are connected to one another via the optical fibers 230a-n.

The first switch 210 includes first clock and data recovery (CDR) components 212a-n and a first plurality of optical modules (first optics 214a-n). The first optics 214a-n include a first set of ports 216a-n. Each of the first CDR components 212a-n may serve more than one port depending on a particular deployment of the system 200. For example, the CDR component 212a serves four ports (ports 216a-d). Similarly, the second switch 220 includes second CDR components 222a-n and a second plurality of optical modules (second optics 224a-n). The second optics 224a-n include a second set of ports 226a-n.

The first and second sets of ports 216a-n and 226a-n are configured to transmit and/or receive optical signals propagated via respective optical fibers 230a-n. Each of the optical fibers 230a-n forms an optical communication channel between a port of the first set of ports 216a-n and a respective port of the second set of ports 226a-n.

One of ordinary skill in the art would readily appreciate that other components such as buffers, digital signals processors, etc. may be present in the first switch 210 and/or the second switch 220 depending on a particular configuration and use case scenario. These other components are omitted from the description so as not to obscure example embodiments.

In the system 200, the first set of ports 216a-n operate at the same data rate. For example, all channels of 10G/400G ports operate at the same data rate of 10.3 Gbps or all channels of 25G/100G ports operate at the same data rate of 25.78125 Gbps. In one or more example embodiments, the frequency in which the data is transmitted in the system 200 directly coincides with the transmission data rate. If the first set of ports 216a-n transmit the optical signals at the same data rate (bits per second), then they transmit at the same frequency (MHz or GHz).

Figure 3:
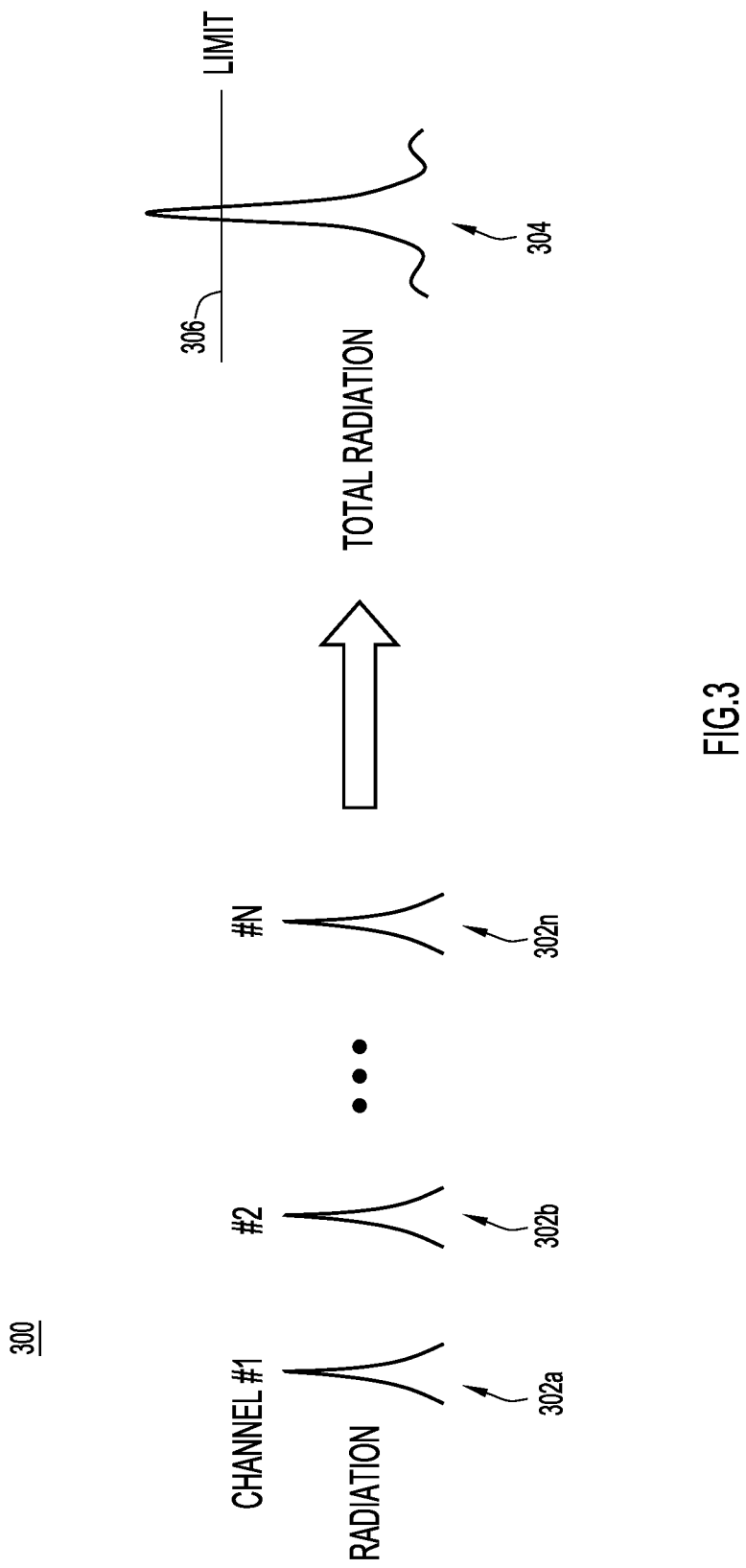
FIG. 3 is a diagram illustrating electromagnetic interference associated with the plurality of channels emitted by a system depicted in FIG. 2.

FIG. 3 is a diagram 300 illustrating radiation measurements for the system 200. Radiation energy emitted from the channels 302a-n (the first set of ports 216a-n in FIG. 2) occurs at essentially the same frequency and is added together producing a total radiation 304. Due to the additive effect of the radiation at the same frequency, the total radiation 304 at that frequency exceeds a regulatory limit 306 and therefore may not pass the EMC/EMI test. In other words, since the channels 302a-n operate at the same data rate (transmit/receive at the same frequency), the radiation energy for each of the channels is added for purposes of measuring EMI at any given frequency. Consequently, it may be challenging for the system 200 to pass the EMC/EMI test, especially with port density increasing to 48 ports per slot or 100 ports or more per modular chassis.

Figure 4:
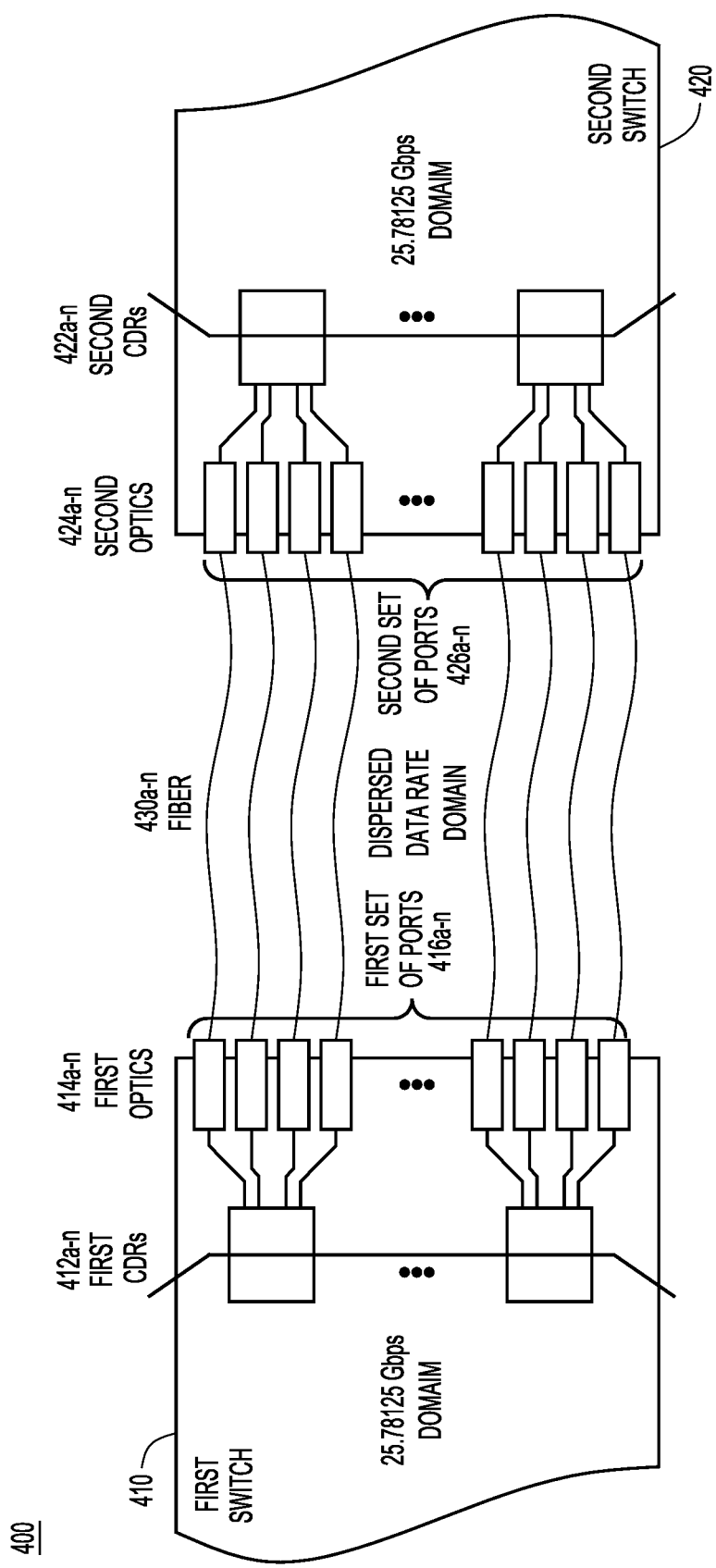
FIG. 4 is a block diagram illustrating a system configured to product a plurality of transmit signals for a plurality of processing channels at offset data rates, according to an example embodiment.

FIG. 4 depicts a system 400 in which ports of first and second network devices are configured to operate at dispersed or offset data rates, according to an example embodiment. The system 400 includes a first switch 410, a second switch 420, and optical fibers 430a-n connecting between respective ports of the first switch 410 and second switch 420.

The first switch 410 and the second switch 420 are network elements or devices (nodes). The first switch 410 includes first CDR components (CDRs) 412a-n and a first plurality of optical modules (first optics 414a-n). The first optics 414a-n include a first set of ports 416a-n. Similarly, the second switch 420 includes second CDR components (CDRs) 422a-n and a second plurality of optical modules (second optics 424a-n). The second optics 424a-n include a second set of ports 426a-n. The first and second sets of ports 416a-n and 426a-n are configured to transmit and/or receive signals to and/or from the optical fibers 430a-n.

One of ordinary skill in the art would readily appreciate that other components such as buffers, digital signals processors, etc. may be present in the first switch 410 and/or the second switch 420 depending on a particular configuration and use case scenario. These other components are omitted from the description for simplicity.

In the system 400, the first switch 410 and the second switch 420 operate at a main data rate, such as, for example, 25.78125 Gbps. Each of the first CDRs 412*a-n* serves four of the first set of ports 416*a-n* and each of the second CDRs 422*a-n* serve four of the second set of ports 426*a-n*. The first set of ports 416*a-n* and the second set of ports 426*a-n* may be grouped into two or more channel groups such that transmit signals in each channel group are at data rates that are offset from one another. Each of the first optics 414*a-n* converts the transmit signals to corresponding optical transmit signals which are then provided, at respective different data rates, to the optical fibers 430*a-n* via respective ones of the first set of ports 416*a-n*. That is, each of the first optics 414*a-n* is an optical transmitter that converts a transmit signal to a corresponding optical transmit signal for transmission onto a respective one of the optical fibers 430*a-n*.

The channel groups have an interval of 1 MHz or greater from other groups to offset the data rates. For example, the main data rate of 25.78125 Gbps is used for the first channel group, 25.78225 Gbps is used for the second channel group, 25.78325 Gbps is used for the third channel group, and so on. Accordingly, the radiated energy from each channel group is treated as a separate frequency point since the data rates of the channel groups are offset by at least 1 Mbps corresponding to 1 MHz. Further, the system 400 is compatible with the current systems (other components of the PCB) that operate at the main data rate because the offset data rates are applied only to the channel groups or only between the first and second CDRs 412*a-n* and 422*a-n* and the first and second optics 414*a-n* and 424*a-n*.

Figure 5:
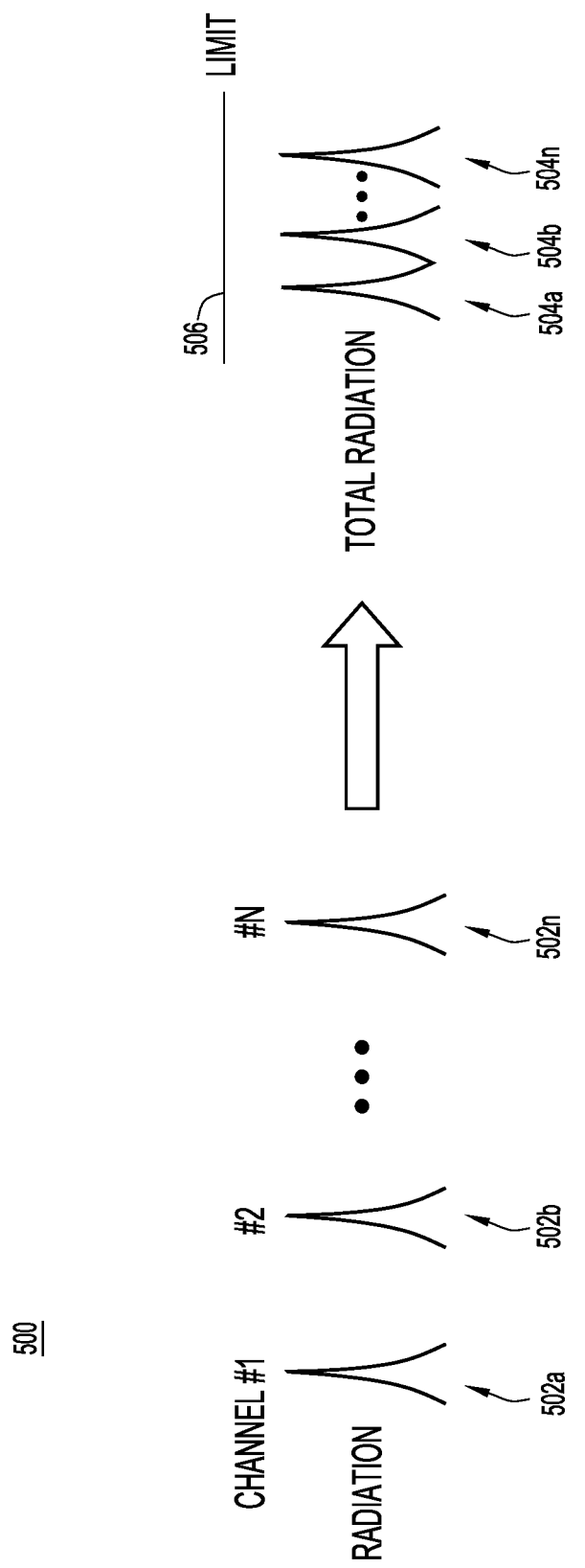
FIG. 5 is a diagram illustrating reduced electromagnetic interference at any given frequency in the system depicted in FIG. 4, resulting from transmit signals at data rates that are offset from one another, according to an example embodiment.

FIG. 5 is a diagram 500 illustrating radiation measurements that would be made for the system 400 in which channel groups or ports are configured to operate at the data rates offset from one another by at least 1 Mbps (1 MHz), according to an example embodiment. Radiation emitted by each of the channels 502*a-n* (channel groups) are detected as separate frequency points 504*a-n* since the frequency interval between each of the channels 502*a-n* is equal to or greater than 1 MHz. The radiation at the separate frequency points 504*a-n* are not added together for purposes of EMI compliance and therefore the EMI at any given frequency will be below the regulatory limit 506. The system 400 passes the EMC test even with port density of 48 per slot or 100 or more per modular chassis.

Figure 6:
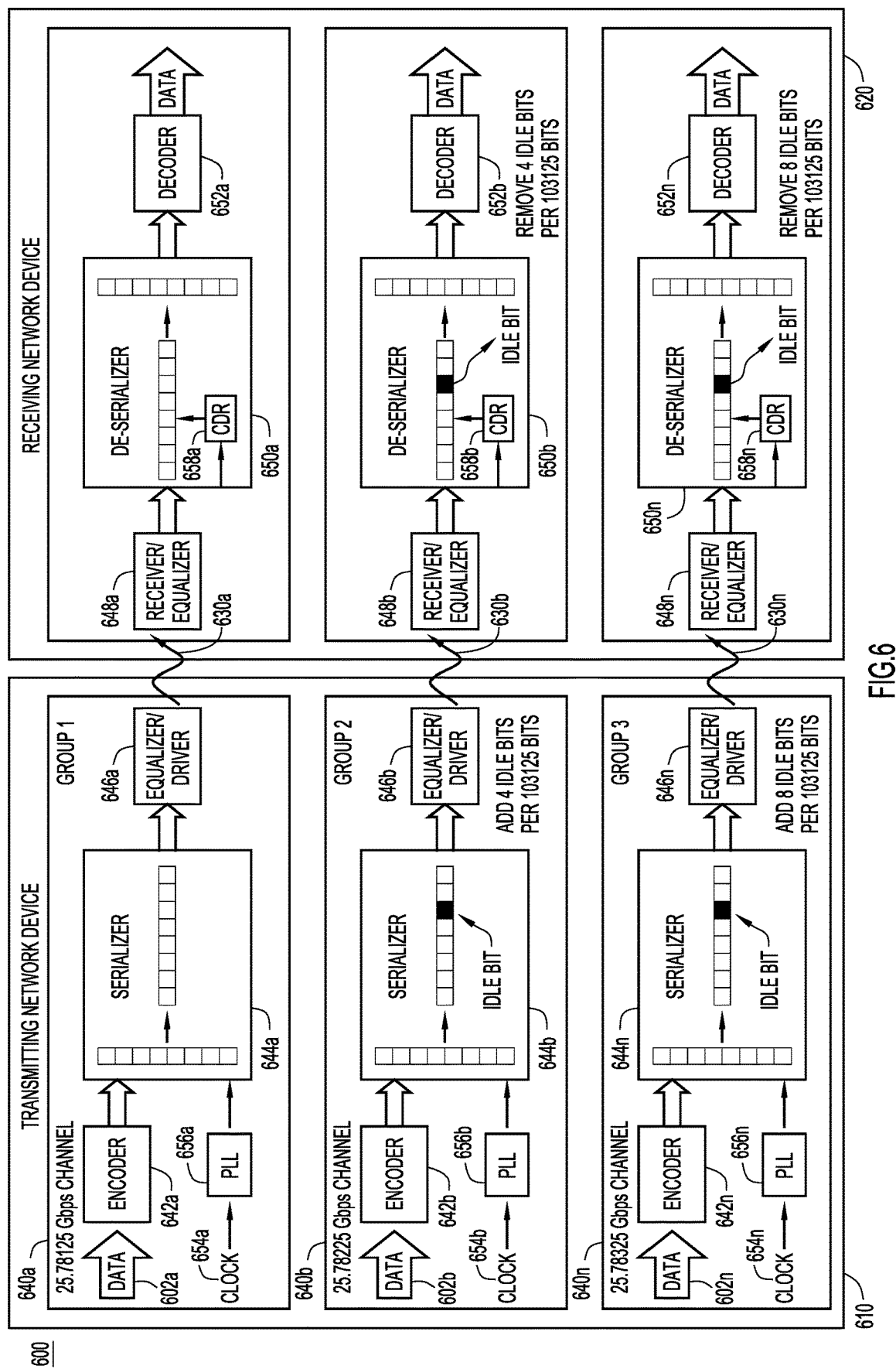
FIG. 6 is a more detailed block diagram of a system in which a plurality of channels are configured to produce transmit signals at different data rates, according to an example embodiment.

FIG. 6 is a block diagram illustrating a system 600 which shows in more detail how a plurality of processing channels are configured to produce transmit signals at different (offset) data rates, according to an example embodiment. The system 600 includes a transmitting network device 610, a receiving network device 620, and optical fibers 630*a-n*.

In the system 600, a coding mechanism is provided that is designed to offset data rates of various processing channel groups 640*a-n*. That is, the plurality of channels, configured to process input data streams 602*a-n*, are divided into channel groups 640*a-n*. Each of the channel groups 640*a-n* may have one or more channels to process input data streams. Each of the channel groups 640*a-n* operates at a different date rate. For example, the first channel group 640*a* (Group 1) operates at the main data rate of the system 600 e.g., 25.78125 Gbps. The other channel groups 640*b-n* (Group 2 and Group 3) are offset at data rates higher than the main data rate (e.g. at least 1 Mbps higher) to reduce electromagnetic interference detected at any given frequency. Each channel is a signal generator that generates a respective transmit signal at a respective data rate.

The transmitting network device 610 includes encoders 642*a-n* each of which is configured to encode a respective one of the input data streams 602*a-n*, serializers 644*a-n* each of which is configured to receive a respective encoded data streams and convert the respective encoded data streams from parallel data form to serial data form and configured to add idle bits to offset the data rates among the channel groups 640*a-n*. In addition, equalizers/drivers 646*a-n* are provided, each of which is configured to drive corresponding optical signals onto a corresponding one of the optical fibers 630*a-n*.

The first serializer 644*a* does not add idle bits since the data stream is to be transmitted at the main data rate. The second serializer 644*b* adds 4 idle bits for each 103125 data bits to offset the data rate by 1 Mbps i.e., to set the data rate to 25.78225 Gbps, and the third serializer 644*n* adds 8 idle bits per 103125 data bits to offset the data rate by 2 Mbps from the main data rate i.e., to set the data rate to 25.78325. It should be understood that the data rate interval/offset is not limited to 1 Mbps and may vary depending on a particular configuration of the system 600.

In an example embodiment, to guarantee the same pace with other remaining system components (such as the switch hardware that runs at 25.78125 Gbps) and since the information being transmitted is the same, idle bits are added into Serializer/Deserializer (SERDES) data stream at the transmitting network device 610 and are removed at the receiving network device 620. To obtain a data rate that is one Mbps higher than the main data rate in the second channel group 640*b*, the following formula may be used:

main data rate/(higher data rate−main data rate)=1 bit

That is, 25.78125 Gb/(25.78225Gb−25.78125Gb)=25781.25/1 or 103125 bit/4 bits. In other words, 4 idle bits need to be added by the serializer 646*b* per 103125 data bits in order to keep the same pace. The code efficiency is 103125/103129=99.996%. Similarly, for the channel group 3 640*n*, the channel data rate needs to be 1 MHz higher than the data rate of the channel group 2 640*b* (25.78325 Gbps). In other words, the serializer 644*n* needs to add 8 idle bits per 103125 data bits, and the code efficiency is 99.992%. Similar techniques apply for other channel groups e.g., the channel data rate is changed to 25.78425 Gbps, 25.78525 Gbps, and so on. The number of idle bits added are synchronized between the transmitting network device 610 and the receiving network device 620 during a SERDES initialization process.

The equalizers/drivers 646*a-n* receive the output data streams from the serializers 644*a-n* at the offset rates and drive corresponding optical transmitters (not shown in FIG. 6) to produce corresponding optical transmit signals for transmission via corresponding ports of the transmitting network device 610 onto the optical fibers 630*a-n*.

Additionally, the transmitting network device 610 includes clocks 654*a-n* and phase lock loops (PLLs) 656*a-n*. The clocks 654*a-n* output a clock signal to the respective PLLs 656*a-n*. The PLLs 656*a-n* tune the frequency provided by the clock signal to offset the data rates among the transmits signals of various channel groups 640*a-n*. For example, the first PLL 656*a* of the first channel group 640*a* may output the main frequency of the system 600 and the second PLL 656*b* of the second channel group 640*b* may output a frequency that is at least one megahertz higher than the main frequency. In other words, the PLLs 656*a-n* tune the output frequencies to produce a frequency interval of at least one megahertz between the channel groups 640*a-n* and provides the offset output frequencies to the serializers 644*a-n*.

The receiving network device 620 includes receivers/equalizers 648*a-n* configured to receive the optical signals propagated through the optical fibers 630a-n and convert the optical signals to data streams. The receiving network device 620 further includes de-serializers 650a-n configured to convert the data streams in the optical signals from parallel to serial form and to remove idle bits added by the serializers 644a-n of the transmitting network device 610. Each of the de-serializers 650b-n remove the idle bits to restore the offset data rate to the main data rate. The respective CDRs 658a-n regenerate clock information of the transmitting network device 610 and instruct the de-serializers 650a-n in the receiving network device 620 how many bits (if any) to remove.

In the system 600, the de-serializer 650a restores the data stream to its serial form without any changes to the data rate. That is, the SERDES modules (the serializer 644a and the de-serializer 650a) are kept as is without any reconfiguration of the frequency and/or data rate. The de-serializer 650b uses frequency information from the CDR 658b and removes 4 idle bits per 103125 data bits. That is, the de-serializer 650b restores the data rate from 25.78225 Gbps back to 25.78125 Gbps. Similarly, the de-serializer 650n uses frequency information from the CDR. 658n and removes 8 idle bits per 103125 data bits to restore the data rate from 25.78325 Gbps to 25.78125 Gbps. The decoders 652a-n of the receiving network device 620 then decode the data streams at the main data rate of the system 600.

According to one or more example embodiments, the coding mechanism depicted in FIG. 6 accommodates different data rates for different groups of channels. The remaining parts of the system 600 still work at the main data rate and only some channel groups are changed to different data rates using idle bits.

Figure 7:
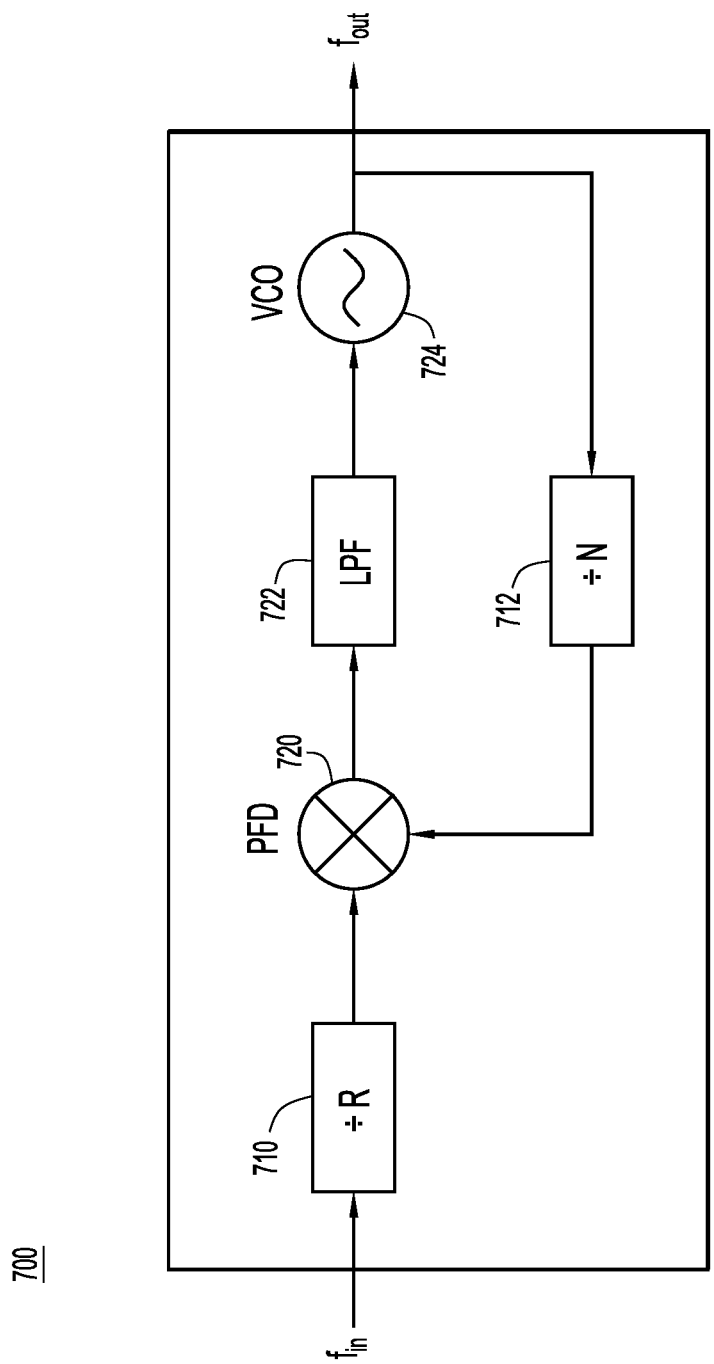
FIG. 7 is a block diagram illustrating a phase lock loop circuit configured to tune a respective channel to a particular frequency so that a plurality of channels produce transmit signals at different data rates, according to an example embodiment.

FIG. 7 is a diagram illustrating a phase lock loop circuit (PLL) 700 used for adjusting data rates of various channel groups, according to an example embodiment. The PLL circuit 700 may be used for each of the PLLs 656a-n of FIG. 6 based on one of the clock signals generated by the clocks 654a-n of FIG. 6.

The PLL circuit 700 includes two dividers 710 and 712 whose divisor values are set by a first register ("R") and a second register ("N"), respectively, to tune to a particular output frequency and offset the data rates between various channel groups. The PLL circuit 700 further includes a phase frequency detector (PFD) 720, a low pass filter (LPF) 722, and a voltage control oscillator (VCO) 724, as is known in the art.

In operation, a clock signal is input into the PLL 700 at an input frequency ($f_{in}$) e.g., 156.25 MHz. The clock signal of 156.25 MHz is associated with a main data rate, for example.

The divider 710 divides the input frequency ($f_{in}$) of the block signal by a value R and is output to the PFD 720. In one example, the R register may be a ten bit register and stores a constant value of "625" such that a value of 0.25 (156.25/625) is the divisor used by the divider 710.

Next, the LPF 722 filters the output of the PFD 720 to generate a value that is supplied to the VCO 724. The VCO 724 outputs a signal at a frequency to be used by a respective serializer.

The output of the VCO 724 is fed back to the divider 712 that divides the output signal of the VCO 724 ($f_{out}$) by the value N. For example, when the output frequency ($f_{out}$) is to be 25.78125 GHz (the main data rate), the register that stores the value of N is configured as a 17-bit register and stores a value of "103125". As such, the divider 712 divides $f_{out}$ by 103125. On the other hand, when the output frequency ($f_{out}$) is to be offset from the main data rate by 1 Mbps, the value of the N is "103129" (offset by 4 bits). As a result, the output frequency ($f_{out}$) is 25.782125 (0.25*103129). When the output frequency ($f_{out}$) is to be offset by 2 Mbps, the value of the N is 103133 (offset by 8 bits). As a result, the output frequency ($f_{out}$) is 25.783125 (0.25*103133). In other words, the value N is configured to be at an increased value for each channel group to offset the data rates between various channel groups.

As an example, the output frequency ($f_{out}$) is 25.78125 GHz for the first channel group that outputs transmit signals at the main data rate (in which case the value of N used by divider 712 is 103125); the output frequency ($f_{out}$) is 25.78225 GHz for the second channel group (in which case the value of N used by the divider 712 is 103129); the output frequency ($f_{out}$) is 25.78325 GHz for the third channel group (in which case the value of N used by the divider 712 is 103133), and so on.

In an example embodiment, the PLL circuit 700 can adjust parameters to offset the data rates so that the output frequency ($f_{out}$)=N/R×$f_{in}$. The PLL circuit 700 uses the input clock of current system (for example, 156.25 MHz) and the stored values for R and N to tune the output frequency.

Since the data rates are offset by only several MHz, the major components of various optics including laser drivers, transimpedance amplifiers, limiting amplifiers, and so on, still function correctly without modification.

According to various example embodiments, a hardware system with dispersed data rates is provided to mitigate EMI compliance issues. The hardware system includes a code mechanism and PLL configuration while still being compatible with current switch systems because the data rates are offset only at the ports.

While example embodiments describe an integer based code increases, other data rate increase intervals (including non-integer intervals) may be used and are to be considered within the scope of example embodiments. While the groupings described above are at 4 bit intervals, other intervals are possible and may depend on a particular channel speed.

Figure 8:
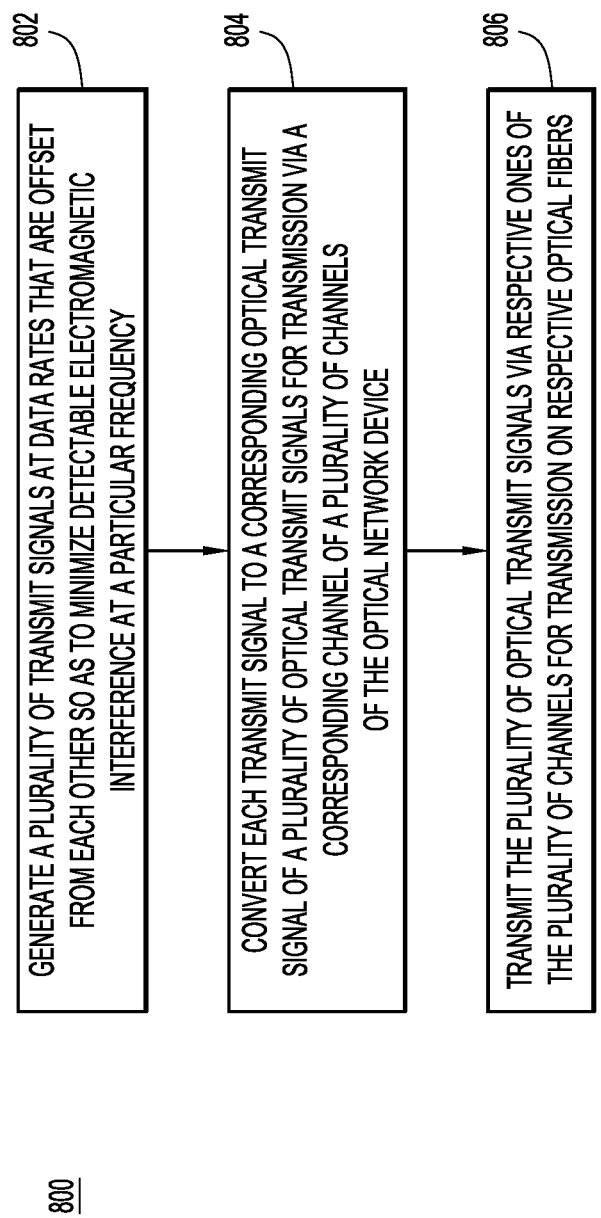
FIG. 8 is a flow chart illustrating a method of transmitting a plurality of optical transmit signals at data rates that are offset from one another and that results in reduced electromagnetic interference at any given frequency, according to an example embodiment.

FIG. 8 is a flow diagram illustrating a method 800 of transmitting a plurality of optical transmit signals at data rates that are offset from one another, according to an example embodiment. The method 800 may be performed by the first switch 410 of FIG. 4 or likewise the transmitting network device 610 of FIG. 6.

At 802, a transmitting network device generates a plurality of transmit signals at data rates that are offset from each other so as to minimize detectable electromagnetic interference at a particular frequency.

At 804, the transmitting network device converts each transmit signal to a corresponding optical transmit signal of a plurality of optical transmit signals for transmission via a corresponding channel of a plurality of channels of the optical network device.

At 806, the transmitting network device transmits the plurality of optical transmit signals via respective ones of the plurality of channels for transmission on respective optical fibers.

According to one or more example embodiments, the operation 802 may include grouping different ones of the plurality of transmit signals into a channel group of a plurality of channel groups. The transmit signals in different channel groups are at data rates offset from each other.

In one form, the operation 802 may include generating one or more transmit signals for a first channel group at a main data rate and generating one or more transmit signals for a second channel group at least one megabit per second greater than the main data rate.

According to one or more example embodiments, the operation 802 may include adding idle bits into a data stream for one more transmit signals of the plurality of transmit signals to increase a data rate for the one or more transmit signals.

In one instance, the method 800 may further include synchronizing, in an initialization process between the transmitting network device and a receiving network device, a number of idle bits to be added to data bits so as to adjust the data rate of a respective transmit signal from among the plurality of transmit signals.

According to one or more example embodiments, the operation 802 may include adjusting a clock signal associated with each transmit signal of the plurality of transmit signals using a phase lock loop to tune to a frequency so as to produce the offset of the data rates among the plurality of transmit signals.

In another form, the operation 802 may include adjusting a clock signal associated with at least one transmit signal from among the plurality of transmit signals using a phase lock loop to tune to a frequency at least one megahertz higher than a main frequency of the optical network device.

Figure 9:
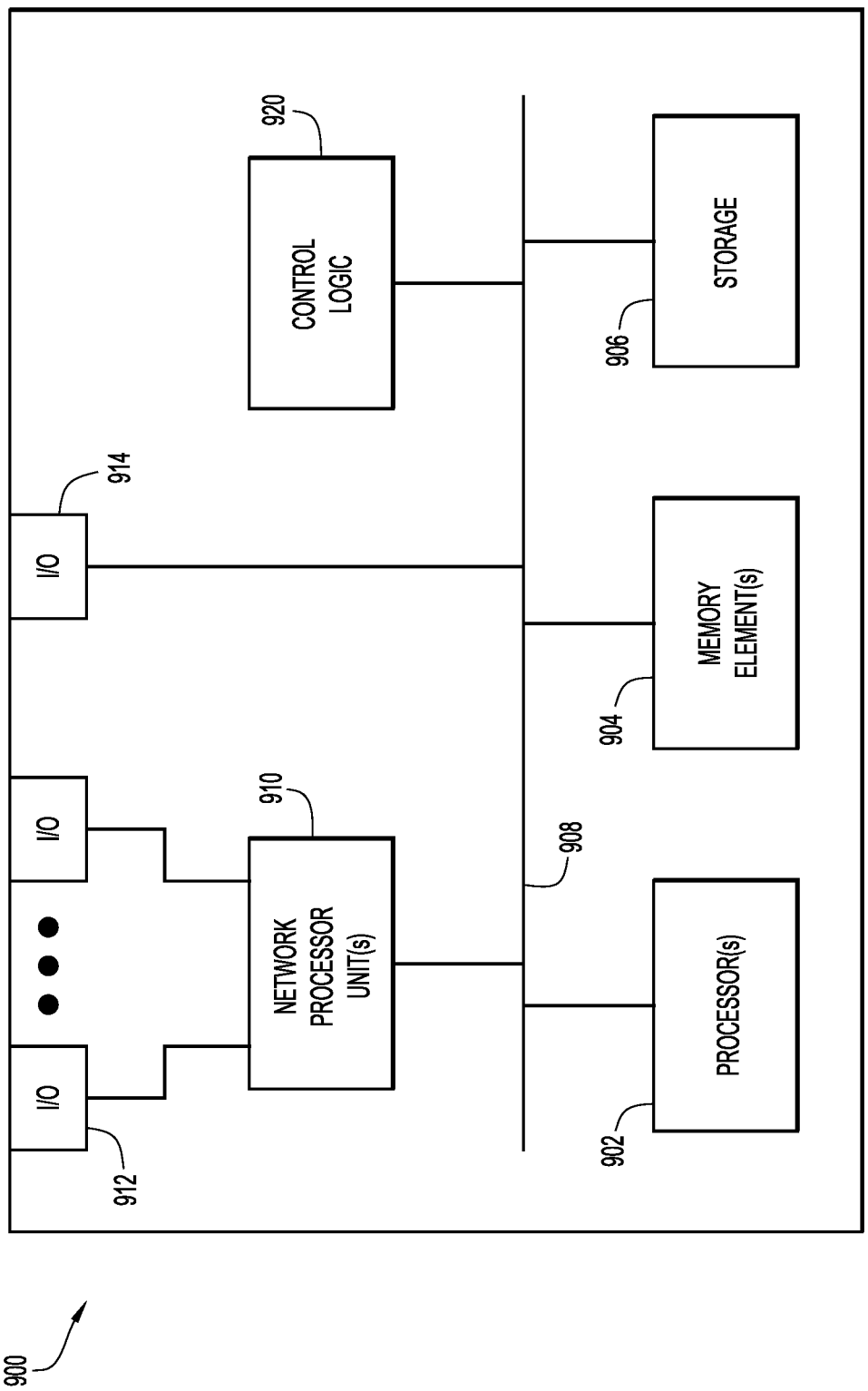
FIG. 9 is a hardware block diagram of a computing device configured to produce a transmit signals of a plurality of processing channels at different data rates, according to an example embodiment.

Reference is now made to FIG. 9. FIG. 9 illustrates a hardware block diagram of a computing device 900 that may perform the functions discussed herein in connection with the techniques depicted in FIGS. 4-8. In various embodiments, a computing device, such as computing device 900 or any combination of computing devices 900, may be configured as any entity/entities as discussed for the techniques depicted in connection with FIGS. 4-8 in order to perform operations of the various techniques discussed herein.

In at least one embodiment, computing device 900 may include one or more processor(s) 902, one or more memory element(s) 904, storage 906, a bus 908, one or more network processor unit(s) 910 interconnected with one or more network input/output (I/O) interface(s) 912, one or more I/O interface(s) 914, and control logic 920. In various embodiments, instructions associated with logic for computing device 900 can overlap in any manner and are not limited to the specific allocation of instructions and/or operations described herein.

In at least one embodiment, processor(s) 902 is/are at least one hardware processor configured to execute various tasks, operations and/or functions for computing device 900 as described herein according to software and/or instructions configured for computing device 900. Processor(s) 902 (e.g., a hardware processor) can execute any type of instructions associated with data to achieve the operations detailed herein. In one example, processor(s) 902 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, one or more memory element(s) 904 and/or storage 906 is/are configured to store data, information, software, and/or instructions associated with computing device 900, and/or logic configured for memory element(s) 904 and/or storage 906. For example, any logic described herein (e.g., control logic 920) can, in various embodiments, be stored for computing device 900 using any combination of memory element(s) 904 and/or storage 906. Note that in some embodiments, storage 906 can be consolidated with memory elements 904 (or vice versa), or can overlap/exist in any other suitable manner.

In at least one embodiment, bus 908 can be configured as an interface that enables one or more elements of computing device 900 to communicate in order to exchange information and/or data. Bus 908 can be implemented with any architecture designed for passing control, data and/or information between processors, memory elements/storage, peripheral devices, and/or any other hardware and/or software components that may be configured for computing device 900. In at least one embodiment, bus 908 may be implemented as a fast kernel-hosted interconnect, potentially using shared memory between processes (e.g., logic), which can enable efficient communication paths between the processes.

In various embodiments, network processor unit(s) 910 may enable communication between computing device 900 and other systems, entities, etc., via network I/O interface(s) 912 to facilitate operations discussed for various embodiments described herein. In various embodiments, network processor unit(s) 910 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 900 and other systems, entities, etc. to facilitate operations for various embodiments described herein. In various embodiments, network I/O interface(s) 912 can be configured as one or more Ethernet port(s), Fibre Channel ports, and/or any other I/O port(s) now known or hereafter developed. Thus, the network processor unit(s) 910 and/or network I/O interface(s) 912 may include suitable interfaces for receiving, transmitting, and/or otherwise communicating data and/or information in a network environment.

I/O interface(s) 914 allow for input and output of data and/or information with other entities that may be connected to computer device 900. For example, I/O interface(s) 914 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 920 can include instructions that, when executed, cause processor(s) 902 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In still another example embodiment, an apparatus is a first switch 410 described in FIG. 4 or a transmitting network device 610 described in FIG. 6. The apparatus includes a signal generator configured to generate a plurality of transmit signals at data rates that are offset from each other so as to minimize detectable electromagnetic interference at a particular frequency and an optical transmitter configured to convert each transmit signal to a corresponding optical transmit signal of a plurality of optical transmit signals for transmission via a corresponding channel of a plurality of channels on respective optical fibers.

According to one or more example embodiments, the signal generator may be configured to generate the plurality of transmit signals by grouping different ones of the plurality of transmit signals into a channel group of a plurality of channel groups, wherein transmit signals in different channel groups are at data rates offset from each other.

In one instance, the signal generator may be configured to generate the plurality of transmit signals by generating one or more transmit signals for a first channel group at a main data rate and generating one or more transmit signals for a second channel group at least one megabit per second greater than the main data rate.

In one form, the signal generator may include a serializer for each channel of the plurality of channels. At least two of a plurality of serializers may be configured to add idle bits into a data stream for a respective transmit signal to increase a data rate for the respective transmit signal.

According to one or more example embodiments, the signal generator may further be configured to synchronize, in an initialization process with an optical receiver, a number of idle bits to be added to data bits so as to adjust the data rate of a respective transmit signal from among the plurality of transmit signals.

According to one or more example embodiments, the apparatus may further include a clock associated with each channel of the plurality of channels. The clock may be configured to output a clock signal at a frequency associated with each transmit signal from among the plurality of transmit signals. The apparatus may further include a phase lock loop associated with each channel of the plurality of channels, and may be configured to tune the frequency of the clock signal output by the clock of the respective channel, so that collectively, the phase lock loop of each of the plurality of channels offsets the data rates among the plurality of transmit signals.

In one instance, a plurality of phase lock loops for the plurality of channels offset the data rates of the plurality of transmit signals by at least one megahertz from one another.

In yet another example embodiment, an apparatus is provided that include a plurality of processing channels, each of which produces a transmit signal at a corresponding different data rate. The plurality of processing channels include a serializer configured to obtain a corresponding input data stream and produce an output data stream at a corresponding data rate and a driver configured to receive the output data stream from the serializer for driving a corresponding optical transmitter to produce a corresponding optical transmit signal for transmission via a corresponding port of an optical network device onto an optical fiber. The serializer in a first processing channel of the plurality of processing channels is configured to produce a first output data stream at a main data rate and serializers of other processing channels are configured to produce output data streams at data rates that are offset by increasing incremental amounts from the main data rate so as to minimize a detectable aggregate amount of electromagnetic interference around the apparatus at any particular frequency.

According to one or more example embodiments, the plurality of processing channels are grouped into channel groups such that the date rates are offset for each of the channel groups.

According to one or more example embodiments, the serializers of the other processing channels are configured to produce the output data streams at the data rates that are offset to have a data rate interval of greater than or equal to one megabits per second.

In one instance, each of the serializers of the other processing channels is configured to add idle bits to the corresponding input data stream to increase the corresponding data rate from the main data rate for a corresponding output data stream.

In one form, each of the plurality of processing channels may further include a clock configured to output a clock signal at a frequency and a phase lock loop configured to tune the frequency of the clock signal output by the clock to produce the corresponding data rate.

According to one or more example embodiments, a plurality of phase lock loops may produce a frequency interval of at least one megahertz among output data streams of the plurality of processing channels.

In yet another example embodiment, a system is provided that includes the devices and operations explained above with reference to FIGS. 4-9.

The programs described herein (e.g., control logic 920) may be identified based upon the application(s) for which they are implemented in a specific embodiment. However, it should be appreciated that any particular program nomenclature herein is used merely for convenience, and thus the embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 906 and/or memory elements(s) 904 can store data, software, code, instructions (e.g., processor instructions), logic, parameters, combinations thereof, and/or the like used for operations described herein. This includes the storage 906 and/or memory elements(s) 904 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein, the terms may be used in a generic sense to include packets, frames, segments, datagrams, and/or any other generic units that may be used to transmit communications in a network environment. Generally, the terms reference to a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    generating a plurality of transmit signals by offsetting the plurality of transmit signals from each other such that at least one of the plurality of transmit signals is detected as a separate energy radiation point by a measurement detector from another one of the plurality of transmit signals, wherein the plurality of transmit signals are at data rates that are offset from each other so as to minimize detectable electromagnetic interference at a particular frequency;
    converting each transmit signal to a corresponding optical transmit signal of a plurality of optical transmit signals for transmission via a corresponding channel of a plurality of channels of an optical network device; and
    transmitting the plurality of optical transmit signals via respective ones of the plurality of channels for transmission on respective optical fibers.

2. The method of claim 1, wherein generating the plurality of transmit signals includes:
    grouping different ones of the plurality of transmit signals into a channel group of a plurality of channel groups, wherein transmit signals in different channel groups are at data rates offset from each other.

3. The method of claim 2, wherein generating the plurality of transmit signals includes:
    generating one or more transmit signals for a first channel group at a main data rate; and
    generating one or more transmit signals for a second channel group at least one megabit per second greater than the main data rate.

4. The method of claim 1, wherein generating the plurality of transmit signals includes:
    adding idle bits into a data stream for one more transmit signals of the plurality of transmit signals to increase a data rate for the one or more transmit signals.

5. The method of claim 4, further comprising:
    synchronizing, in an initialization process between the optical network device and another optical network device, a number of idle bits to be added to data bits so as to adjust the data rate of a respective transmit signal from among the plurality of transmit signals.

6. The method of claim 1, wherein generating the plurality of transmit signals includes:
    adjusting a clock signal associated with each transmit signal of the plurality of transmit signals using a phase lock loop to tune to a frequency so as to produce the offset of the data rates among the plurality of transmit signals.

7. The method of claim 1, wherein generating the plurality of transmit signals includes:
    adjusting a clock signal associated with at least one transmit signal from among the plurality of transmit signals using a phase lock loop to tune to a frequency at least one megahertz higher than a main frequency of the optical network device.

8. The method of claim 1, further comprising:
    synchronizing, in an initialization process between the optical network device and another optical network device, a number of idle bits to be added to data bits so as to adjust a data rate of a respective transmit signal of the plurality of transmit signals.

9. An apparatus comprising:
    a signal generator configured to generate a plurality of transmit signals by offsetting the plurality of transmit signals from each other such that at least one of the plurality of transmit signals is detected as a separate energy radiation point by a measurement detector from another one of the plurality of transmit signals, wherein the plurality of transmit signals are at data rates that are offset from each other so as to minimize detectable electromagnetic interference at a particular frequency; and
    an optical transmitter configured to convert each transmit signal to a corresponding optical transmit signal of a plurality of optical transmit signals for transmission via a corresponding channel of a plurality of channels on respective optical fibers.

10. The apparatus of claim 9, wherein the signal generator is configured to generate the plurality of transmit signals by:
    grouping different ones of the plurality of transmit signals into a channel group of a plurality of channel groups, wherein transmit signals in different channel groups are at data rates offset from each other.

11. The apparatus of claim 10, wherein the signal generator is configured to generate the plurality of transmit signals by:
    generating one or more transmit signals for a first channel group at a main data rate; and
    generating one or more transmit signals for a second channel group at least one megabit per second greater than the main data rate.

12. The apparatus of claim 9, wherein the signal generator includes a serializer for each channel of the plurality of channels, at least two of a plurality of serializers are configured to add idle bits into a data stream for a respective transmit signal to increase a data rate for the respective transmit signal.

13. The apparatus of claim 12, wherein the signal generator is further configured to synchronize, in an initialization process with an optical receiver, a number of idle bits to be added to data bits so as to adjust the data rate of a respective transmit signal from among the plurality of transmit signals.

14. The apparatus of claim 9, further comprising:
    a clock associated with each channel of the plurality of channels, the clock configured to output a clock signal at a frequency associated with each transmit signal from among the plurality of transmit signals; and
    a phase lock loop associated with each channel of the plurality of channels, and configured to tune the frequency of the clock signal output by the clock of the respective channel, so that collectively, the phase lock loop of each of the plurality of channels offsets the data rates among the plurality of transmit signals.

15. The apparatus of claim 14, wherein a plurality of phase lock loops for the plurality of channels offset the data rates of the plurality of transmit signals by at least one megahertz from one another.

16. An apparatus comprising:
a plurality of processing channels, each of which produces a transmit signal at a corresponding different data rate and includes:
   a serializer configured to obtain a corresponding input data stream and produce an output data stream at a corresponding data rate, and
   a driver configured to receive the output data stream from the serializer for driving a corresponding optical transmitter to produce a corresponding optical transmit signal for transmission via a corresponding port of an optical network device onto an optical fiber,
wherein the serializer in a first processing channel of the plurality of processing channels is configured to produce a first output data stream at a main data rate, and serializers of other processing channels are configured to produce output data streams at data rates that are offset by increasing incremental amounts from the main data rate so as to minimize a detectable aggregate amount of electromagnetic interference around the apparatus at any particular frequency, and
wherein the plurality of processing channels further include a plurality of phase lock loops configured to produce a frequency interval of at least one megahertz among output data streams of the plurality of processing channels.

17. The apparatus of claim 16, wherein the plurality of processing channels are grouped into channel groups such that the data rates are offset for each of the channel groups.

18. The apparatus of claim 16, wherein the serializers of the other processing channels are configured to produce the output data streams at the data rates that are offset to have a data rate interval of greater than or equal to one megabits per second.

19. The apparatus of claim 16, wherein each of the serializers of the other processing channels is configured to add idle bits to the corresponding input data stream to increase the corresponding data rate from the main data rate for a corresponding output data stream.

20. The apparatus of claim 16, wherein each of the plurality of processing channels further includes:
   a clock configured to output a clock signal at a frequency; and
   a phase lock loop of the plurality of phase lock loops configured to tune the frequency of the clock signal output by the clock to produce the corresponding data rate.

* * * * *